(12) United States Patent
Inoue

(10) Patent No.: US 11,878,367 B2
(45) Date of Patent: Jan. 23, 2024

(54) OPTICAL DEVICE AND ARTICLE MANUFACTURING METHOD

(71) Applicant: CANON KABUSHIKI KAISHA, Tokyo (JP)

(72) Inventor: Yukihiro Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 739 days.

(21) Appl. No.: 16/985,686

(22) Filed: Aug. 5, 2020

(65) Prior Publication Data

US 2021/0060698 A1    Mar. 4, 2021

(30) Foreign Application Priority Data

Aug. 26, 2019 (JP) .................................. 2019-154010

(51) Int. Cl.
*G02B 7/04* (2021.01)
*G02B 19/00* (2006.01)
(Continued)

(52) U.S. Cl.
CPC ............ *B23K 26/0665* (2013.01); *G02B 7/04* (2013.01); *G02B 19/0009* (2013.01); *G02B 19/0047* (2013.01); *G02B 26/0816* (2013.01)

(58) Field of Classification Search
CPC ...... G02B 26/101; G02B 26/105; G02B 7/04; G02B 19/00
See application file for complete search history.

(56) References Cited

U.S. PATENT DOCUMENTS

| 6,635,849 B1 * | 10/2003 | Okawa ................. | B23K 26/064 |
| | | | 219/121.73 |
| 2015/0260985 A1 * | 9/2015 | Kitamura ............. | G02B 5/3083 |
| | | | 359/206.1 |

(Continued)

FOREIGN PATENT DOCUMENTS

| CA | 2460205 A1 | 7/2003 |
| CN | 104162741 B | 6/2016 |

(Continued)

OTHER PUBLICATIONS

Extended European Search Report issued in European Appln. No. 20189587.7 dated Jan. 22, 2021.

(Continued)

*Primary Examiner* — William J Carter
(74) *Attorney, Agent, or Firm* — ROSSI, KIMMS & McDOWELL LLP

(57) ABSTRACT

In an optical device capable of adjusting a focal position of laser light, the accuracy of laser processing is improved. An optical device which processes a subject by irradiating the subject with laser light, includes: a focal position adjustment mechanism configured to adjust a focal position of the laser light; an incident position adjustment mechanism configured to adjust an incident position of the laser light incident on the subject in a direction perpendicular to a focal direction of the laser light; and a control unit configured to control driving of the focal position adjustment mechanism and the incident position adjustment mechanism, wherein the control unit controls the driving of the incident position adjustment mechanism based on an amount of driving of the focal position adjustment mechanism to correct a shift of the incident position due to change of the focal position.

12 Claims, 8 Drawing Sheets

(51) Int. Cl.
    *G02B 26/08*     (2006.01)
    *B23K 26/06*     (2014.01)

(56)     References Cited

U.S. PATENT DOCUMENTS

| | | |
|---|---|---|
| 2018/0134604 A1 | 5/2018 | Ortner |
| 2020/0156184 A1 | 5/2020 | Regaard |

FOREIGN PATENT DOCUMENTS

| | | |
|---|---|---|
| DE | 102013222834 A1 | 5/2015 |
| DE | 102017213511 A1 | 2/2019 |
| EP | 1716963 A1 | 11/2006 |
| JP | H052146 A | 1/1993 |
| JP | H08286135 A | 11/1996 |
| JP | 2006339266 A | 12/2006 |
| JP | 2008032524 A | 2/2008 |
| JP | 2012189659 A | 10/2012 |
| JP | 2014021366 A | 2/2014 |
| JP | 2014117722 A | 6/2014 |
| JP | 2014133242 A | 7/2014 |
| JP | 2016002585 A | 1/2016 |
| JP | 2016103007 A | 6/2016 |
| WO | 2013038606 A1 | 3/2013 |
| WO | 2015067411 A1 | 5/2015 |

OTHER PUBLICATIONS

Office Action issued in Chinese Appln. No. 202010847078.2 dated Aug. 29, 2022. English translation provided.

\* cited by examiner

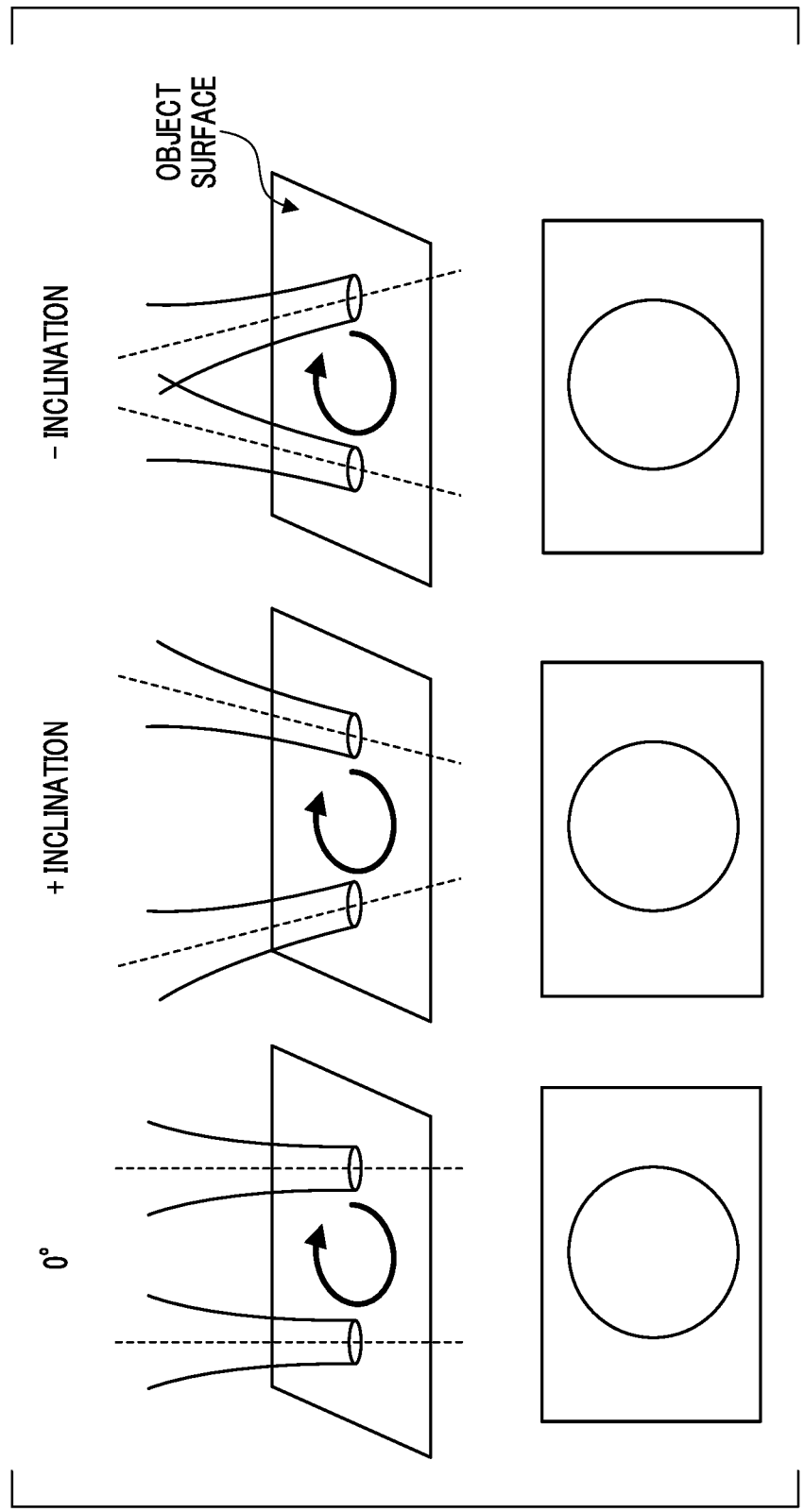

OPTICAL DEVICE AND ARTICLE MANUFACTURING METHOD

BACKGROUND OF THE INVENTION

Field of the Invention

The present invention relates to an optical device and a method of producing article.

Description of the Related Art

An optical scanning device in a laser processing device or the like may include a translation optical system, a condensing optical system, and a deflection optical system so that light is condensed and radiated to a position (x, y, z) above a subject from an azimuth (θx, θy). A translation optical system is an optical system which translates (parallel-shifts) light incident on a condensing optical system which will be described later to change the azimuth (Japanese Patent Laid-Open No. 2016-103007). A condensing optical system is an optical system which changes a focal position (z) of light to condense the light above a subject. A deflection optical system (also referred to as a "scanning the optical system") is, for example, an optical system which includes a deflection optical element such as a mirror and changes an irradiation position (x, y) of light. Of these optical systems, the translation optical system of Japanese Patent Laid-Open No. 2016-103007 includes a rotatable reflecting member having a first reflecting surface and a second reflecting surface. Furthermore, an optical system in which light reflected by the first reflecting surface is sequentially reflected by a plurality of reflecting surfaces and is incident on the second reflecting surface is included. In addition, an adjustment unit which adjusts an optical path of light reflected by the second reflecting surface and emitted from the reflecting member by changing a rotation angle of the reflecting member is included. With such a configuration, translation (parallel shifting) of light emitted from the reflecting member is realized. Furthermore, light can be translated in directions along two axes using two translation optical system sets. If light emitted from a reflecting member enters a condensing optical system (a condensing lens) while being eccentric with respect to being parallel, condensed light inclined at an inclination angle according to the amount eccentricity and a focal length of the condensing optical system is emitted from the condensing optical system. For example, if a subject can be irradiated with condensed light in an optical processing device, the condensed light can be used for processing an object such as drilling due to thermal or wave effects.

In an optical processing device using an optical scanning device as described above, when a surface of an object to be processed has a concave and convex shape or a curved surface shape, it may be difficult to exactly align a focal position of laser light with a surface position on the object and the accuracy of laser processing may deteriorate.

SUMMARY OF THE INVENTION

The present invention improves the accuracy of laser processing in an optical device capable of adjusting a focal position of laser light.

In order to solve the above-described problems, the present invention is an optical device which processes a subject by irradiating the subject with laser light, including: a focal position adjustment mechanism which adjusts a focal position of the laser light; an incident position adjustment mechanism which adjusts an incident position of the laser light incident on the subject in a direction perpendicular to a focal direction of the laser light; and a control unit which controls driving of the focal position adjustment mechanism and the incident position adjustment mechanism, wherein the control unit controls the driving of the incident position adjustment mechanism based on an amount of driving of the focal position adjustment mechanism to correct shifting of the incident position due to change of the focal position.

Further features of the present invention will become apparent from the following description of exemplary embodiments with reference to the attached drawings.

BRIEF DESCRIPTION OF THE DRAWINGS

FIG. 9 is a diagram illustrating an example of a state of laser processing according to the embodiment.

DESCRIPTION OF THE EMBODIMENTS

Figure 1:
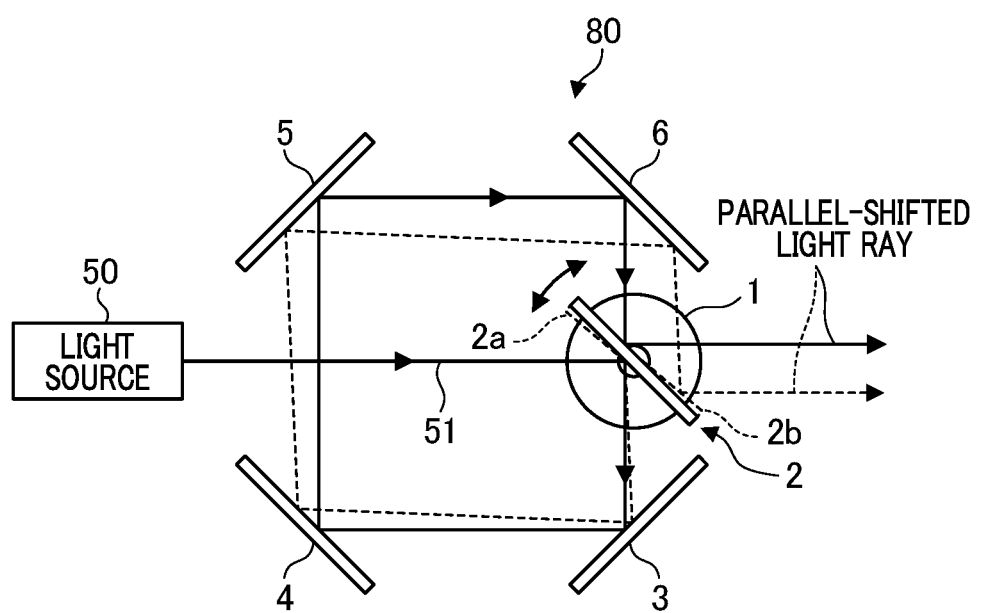
FIG. 1 is a diagram illustrating an example of a configuration of a part of an optical device according to an embodiment.

Embodiments of the present invention will be described below with reference to the accompanying drawings. In all of the drawings for explaining the embodiments, as a general rule (unless otherwise noted), members and the like which are the same are denoted by the same reference numerals and repeated description thereof will be omitted.

Embodiment of Processing Device

FIG. 1 is a diagram illustrating an example of a configuration of a part of an optical device according to an embodiment. An optical device in the embodiment can control a path (an optical path) of emitted light and, for example, translate (parallel-shift) light rays. A light ray parallel shift mechanism (a translation optical system) in the embodiment includes a mirror member 2 (also referred to as a "reflecting member") configured to reflect a light ray 51 from a laser light source 50. In the following description, a case in which each reflecting surface can be regarded as a plane and the optical path is translated will be exemplified. The mirror member 2 is made of, for example, glass and has a first reflecting surface 2a which receives the light ray 51 from the light source 50 and a second reflecting surface 2b on the opposite side. The first reflecting surface 2a and the second reflecting surface 2b are each covered with a coating with a high reflectance. The mirror member 2 may be formed in a prism shape or the first reflecting surface 2a and the second reflecting surface 2b may be formed independently from each other.

Figure 2:
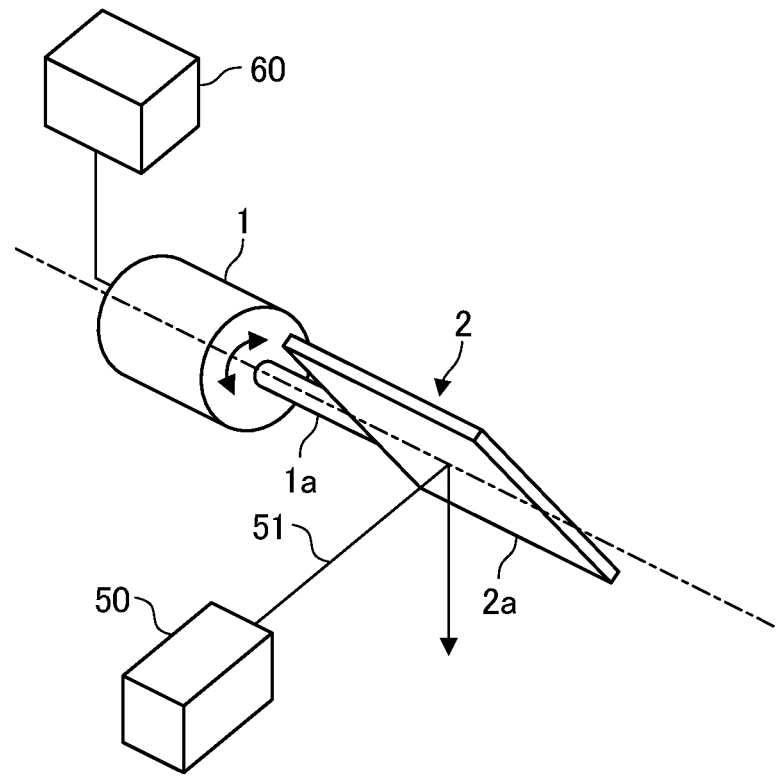
FIG. 2 is a diagram illustrating an example of a configuration of a drive unit which changes an angle of a reflecting member.

Also, the mirror member 2 whose angle can be changed is configured so that an optical path of light emitted from the optical device can be controlled (changed). Here, FIG. 2 is a diagram illustrating an example of a configuration of a drive unit 1 which changes an angle of the reflecting member 2. As shown in FIG. 2, the mirror member 2 is pivotally supported by an output shaft 1a of a (galvano) motor 1 (the drive unit). A control unit 60 outputs a drive signal to the motor 1 and the motor 1 rotates the mirror member 2 via the output shaft 1a by an amount of driving according to the drive signal. In this way, the mirror member 2 is configured to be rotatable (so that an angle thereof can be changed). Here, the mirror member 2 is inclined at about 45 degrees with respect to the light ray 51 from the light source 50. In this specification, such a mirror member is referred to as a "galvano mirror optical system." The mirror member 2 may be configured to control an optical path of light emitted from the optical device but the present invention is not limited to this configuration.

Referring to FIG. 1 again, the translation optical system has an optical system 80 in which light reflected by the mirror member 2 is sequentially reflected by a plurality of reflecting surfaces and is incident on the mirror member 2. The optical system 80 includes, for example, four mirrors 3, 4, 5, and 6 (reflecting surfaces) fixedly arranged to be line-symmetric with respect to the light ray 51. The light reflected by the first reflecting surface 2a of the mirror member 2 is sequentially reflected by the mirrors 3, 4, 5, and 6 and is guided to the second reflecting surface 2b of the mirror member 2. The light finally reflected by the second reflecting surface 2b and emitted from the mirror member 2 has a traveling direction which is substantially the same (substantially parallel) as a direction in which the light ray 51 travels.

An angle (a traveling direction) of the emitted light does not change even if a rotation angle of the mirror member 2 is changed. For this reason, it is possible to adjust (translate or parallel-shift) a path of the light reflected by the second reflecting surface 2b and emitted from the mirror member 2 by controlling the rotation angle of the mirror member 2 using the control unit 60.

Figure 3:
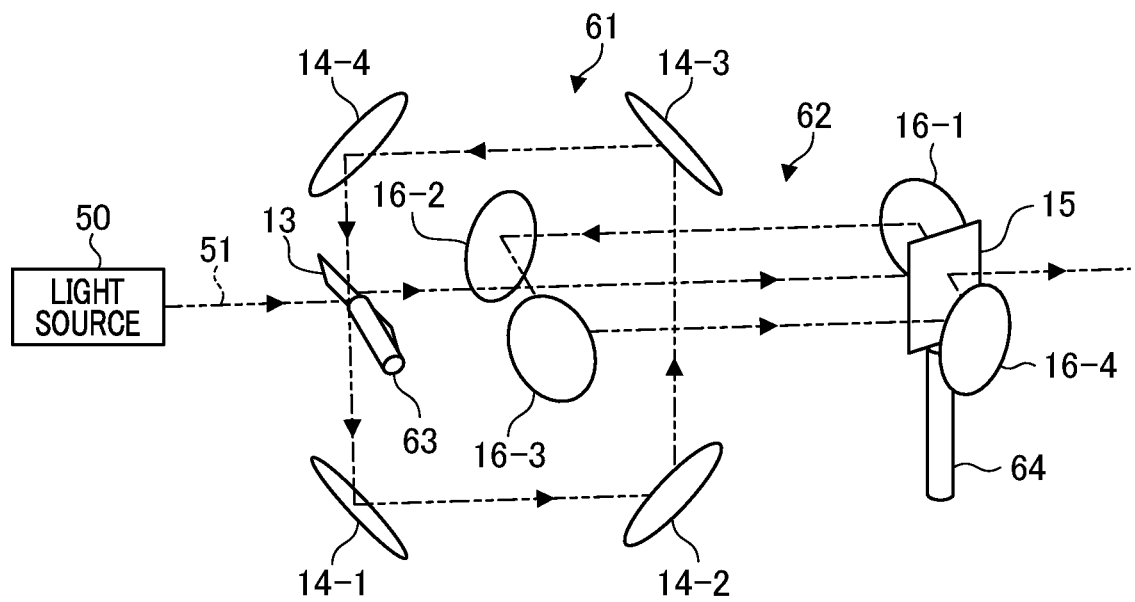
FIG. 3 is a diagram illustrating another example of a configuration of a part of the optical device.

FIG. 3 is a diagram illustrating another example of a configuration of a part of the optical device. The configuration is a combination of the configuration illustrated in FIG. 1 and includes a first translation optical system 61 which receives the light ray 51 from the light source 50 and a second translation optical system 62 which receives emitted light from the first translation optical system 61. The first translation optical system 61 has the mirror member 13 whose angle can be changed and which reflects the light ray 51 from the light source 50. Furthermore, the first translation optical system 61 has mirrors 14-1, 14-2, 14-3, and 14-4. The second translation optical system 62 has the mirror member 15 whose angle can be changed and which reflects a light ray emitted from the first translation optical system. In addition, the second translation optical system 62 has mirrors 16-1, 16-2, 16-3, and 16-4. Moreover, a rotation axis 63 of the mirror member 13 of the first translation optical system 61 and a rotation axis 64 of the mirror member 15 of the second translation optical system 62 are arranged to be non-parallel, for example, orthogonal to each other.

In the first translation optical system 61, incident light reflected by the first reflecting surface of the mirror member 13 is sequentially reflected by the mirrors 14-1, 14-2, 14-3, and 14-4 and is guided to the second reflecting surface of the mirror member 13 opposite to the first reflecting surface. The light reflected by the second reflecting surface and emitted from the mirror member 13 is incident on the mirror member 15 of the second translation optical system 62. In the second translation optical system 62, incident light reflected by the first reflecting surface of the mirror member 15 is sequentially reflected by the mirrors 16-1, 16-2, 16-3, and 16-4 and is guided to the second reflecting surface of the mirror member 15 opposite to the first reflecting surface. The light finally reflected by the second reflecting surface of the mirror member 15 and emitted from the mirror member 15 has a traveling direction which is substantially the same (substantially parallel) as a direction in which the light ray 51 travels. As shown in FIG. 3, an arrangement in which a plane formed by an optical path formed through reflection by each mirror of the first translation optical system 61 and a plane formed by an optical path formed through reflection by each mirror of the second translation optical system 62 intersect may be adopted. It is possible to reduce a size of the optical device by arranging the two translation optical systems such that they intersect each other in this way.

Figure 4:
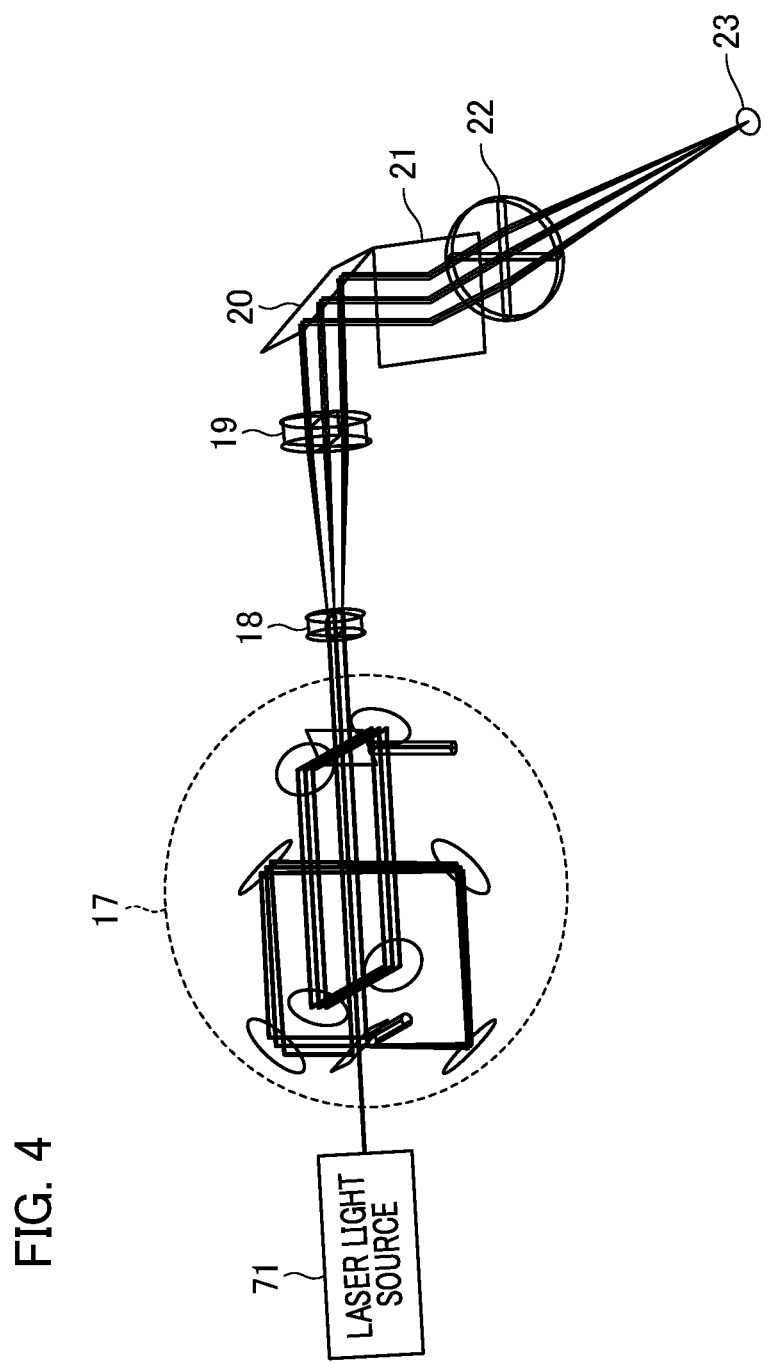
FIG. 4 is a diagram illustrating an example of a configuration of a laser processing device including a translation optical system.

A processing device which includes the translation optical system described above and the optical system in which light emitted from the translation optical system is guided (radiated) to an object (a subject) will be described below. FIG. 4 is a diagram illustrating an example of a configuration of a laser processing device including the translation optical system. The laser processing device illustrated in FIG. 4 includes the translation optical system 17 described with reference to FIG. 3 on a rear side (a rear stage) of the laser light source 71. A light ray expanding optical system is included on a rear side thereof, which increases an amount of translation and a diameter of the light ray to required amounts. The light ray expanding optical system includes a condensing lens 18 and a collimator lens 19. Furthermore, a condensing optical system (a condensing lens 22) is included on a rear side of the light ray expanding optical system, and thus laser light is condensed and radiated to an object 23 arranged on a focal plane thereof. In addition, (galvano)mirrors 20 and 21 (a deflection optical system) are included between the light ray expanding optical system and the condensing optical system and an incident position (x, y) serving as a target above the object 23 is irradiated with light through adjustment of the rotation angle. That is to say, it can be said that the (galvano) mirrors 20 and 21 are mechanisms for adjusting an incident position of light. The (galvano) mirrors 20 and 21 adjust an incident position in which laser light is incident on the object 23 in a direction perpendicular to a focal direction of the laser light.

According to the above configuration, it is possible to make the light ray incident on the condensing optical system eccentric with respect to being parallel using the translation optical system 17. Thus, it is possible to change (or adjust) an angle (an incident angle) of the light ray emitted from the condensing optical system and incident on the object 23. That is to say, it can be said that the translation optical system 17 is an angle adjustment mechanism. Furthermore, it is possible to change an irradiation position on a focal plane on the object 23 by adjusting a relative interval between the condensing lens 18 and the collimator lens 19 in the light ray expanding optical system. As a result, it is possible to perform cutting or the like of an object such that it has a shape of a tapered hole and an oblique cross section.

Figure 5:
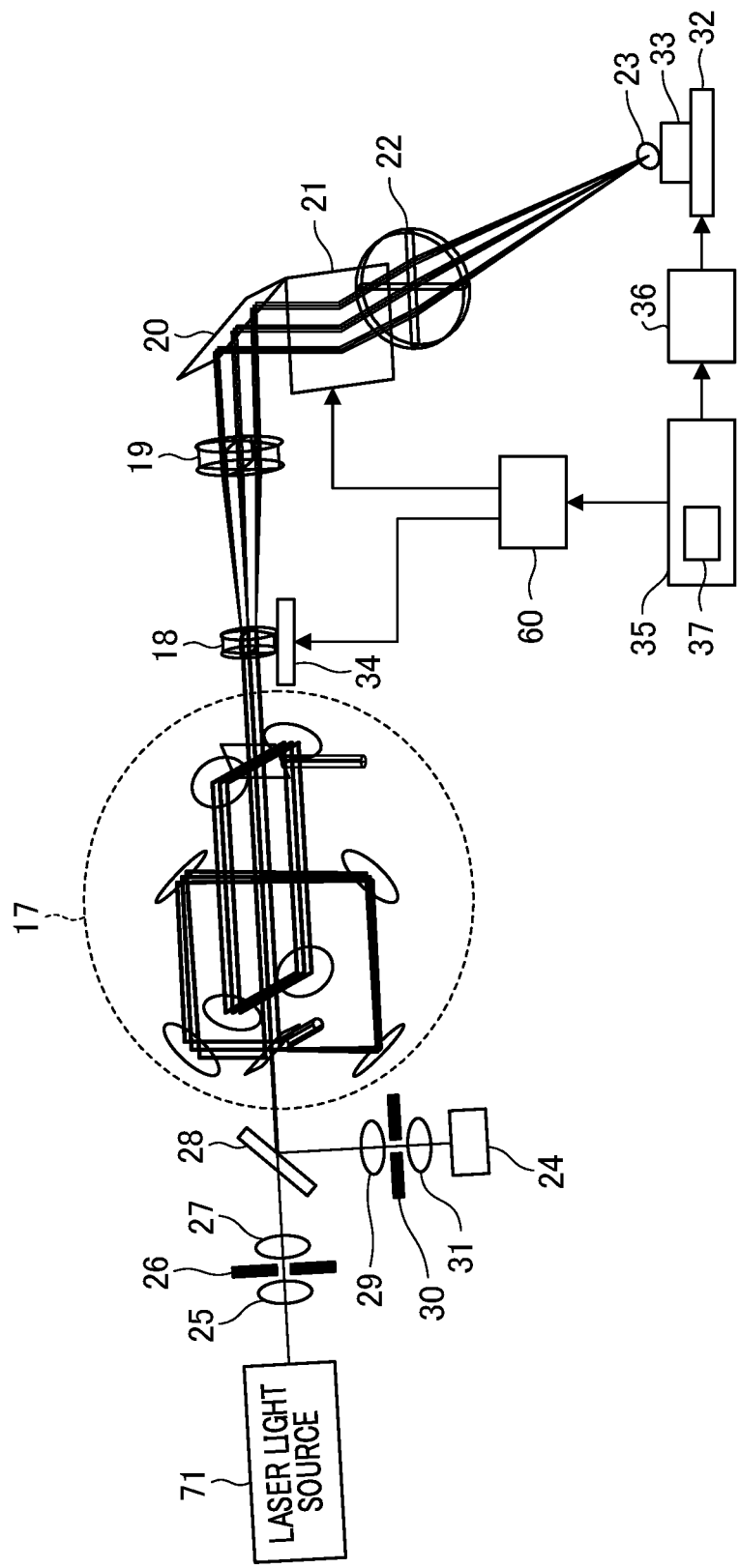
FIG. 5 is a diagram illustrating an example of a configuration of the laser processing device according to the embodiment.

A laser processing device 100 as the optical device according to the embodiment will be described below. FIG. 5 is a diagram illustrating an example of a configuration of the laser processing device 100 according to the embodiment. As shown in FIG. 5, the laser processing device 100 has a configuration in which laser processing is performed by irradiating an object with light rays from the laser light source 71 via the above-described optical device including the translation optical system, the light ray expanding optical system, the deflection optical system, and the condensing optical system. As the laser light source 71, for example, a femtosecond solid-state laser or the like having an oscillation wavelength of 1030 nm, a frequency of 100 kHz, and a pulse width of 350 femtosecond (fs), and an output of 100 μJ/pulse can be used. As the object 23, for example, a stainless plate (of SUS304) or the like can be used.

Also, the laser processing device 100 may include a confocal optical system in which an image of reflected light from the object 23 is formed through irradiation of laser light and a photodetector 24 (a detection unit) which is a light amount measurement means which detects this image forming light. Here, the reflected light includes specularly reflected light and scattered light. The light ray emitted from the laser light source 71 is incident on the condensing lens 25 which is a condensing means and is condensed in a pinhole of a first pinhole mask 26 through the condensing lens 25. A light ray which has passed through the pinhole passes through the collimator lens 27 and is incident on a branching mirror 28. The object 23 is irradiated with a light ray which has been transmitted through the branching mirror 28 via the optical device including the translation optical system, the light ray expanding optical system, the deflection optical system, and the condensing optical system.

The light reflected from the object 23 returns to the branching mirror 28 via the optical device including the translation optical system, the light ray expanding optical system, the deflection optical system, and the condensing optical system. The light reflected by the branching mirror 28 is incident on the condensing lens 29 and is condensed in a pinhole of a second pinhole mask 30 through the condensing lens 29. A light ray which has passed through the pinhole is received by the photodetector 24 through the collimator lens 31.

In this confocal optical system, the first pinhole mask 26 and the second pinhole mask 30 are arranged at a conjugate position via the branching mirror 28. That is to say, an optical distance from the branching mirror 28 to the pinhole of the first pinhole mask 26 is equal to an optical distance from the branching mirror 28 to the pinhole of the second pinhole mask 30.

Also, the object 23 is fixed and supported by a suction holding mechanism (vacuum chuck) 33 above an XY stage 32 which is movable in a plane perpendicular to an optical axis of the condensing optical system. In the XY stage 32, an X-Y plane is a plane perpendicular to the optical axis of the condensing optical system and a Z axis is an axis which is parallel to the optical axis of the condensing optical system.

Furthermore, the condensing lens 18 included in the light ray expanding optical system is fixed above a linear stage 34. The control unit 60 outputs a drive signal to the linear stage 34 and the linear stage 34 moves the condensing lens 18 in an optical axis direction by an amount of driving according to the driving signal. Thus, it is possible to change a position of a focal plane to be radiated on the object 23. That is to say, the linear stage 34 functions as a focal position adjustment mechanism. Furthermore, as the focal position adjustment mechanism, a mechanism for moving the condensing lens 22 included in the condensing optical system in the optical axis direction may be used.

The XY stage 32 is controlled using a computer device 35 through a stage controller 36. The computer device 35 controls an operation of the linear stage 34 as a focus adjustment means through the control unit 60 based on the measurement results (the detection results) of an amount of reflected light using the photodetector 24 in the confocal optical system. The computer device 35 retrieves an in-focus position by moving the condensing lens 18 in the optical axis direction. Although it is desirable that the in-focus position be a position in which an amount of reflected light to be detected by the photodetector 24 is maximized, for example, it is desirable that a position in which an amount of reflected light equal to or more than a threshold value is detected be an in-focus position.

That it to say, there is a point in which the amount of reflected light which is detected by the photodetector 24 in the confocal optical system is maximized with respect to a relative distance between the condensing lens 18 and the object 23, this maximum point being an in-focus position with respect to a surface of the object 23. Furthermore, since the computer device 35 adjusts a Z axis of the linear stage 34 through the control unit 60 so that the amount of reflected light which is detected by the photodetector 24 is maximized, an autofocus operation is realized. It is possible to improve the processing accuracy by performing the autofocus operation every time the object 23 is changed. In addition, with such a configuration, in the laser processing device 100, it is not necessary to drive the XY stage 32 in the Z direction.

Although it is desirable that the light received by the photodetector 24, that is, the light for determining the focal position, have the same intensity as the light for processing the object 23, it is desirable that the light be weaker than the light for performing processing. This is because, if the light for determining the focal position is strong, the object 23 is processed and if the focal position is adjusted based on the light detected in the processed state, the focal position is likely to be shifted.

Figure 6:
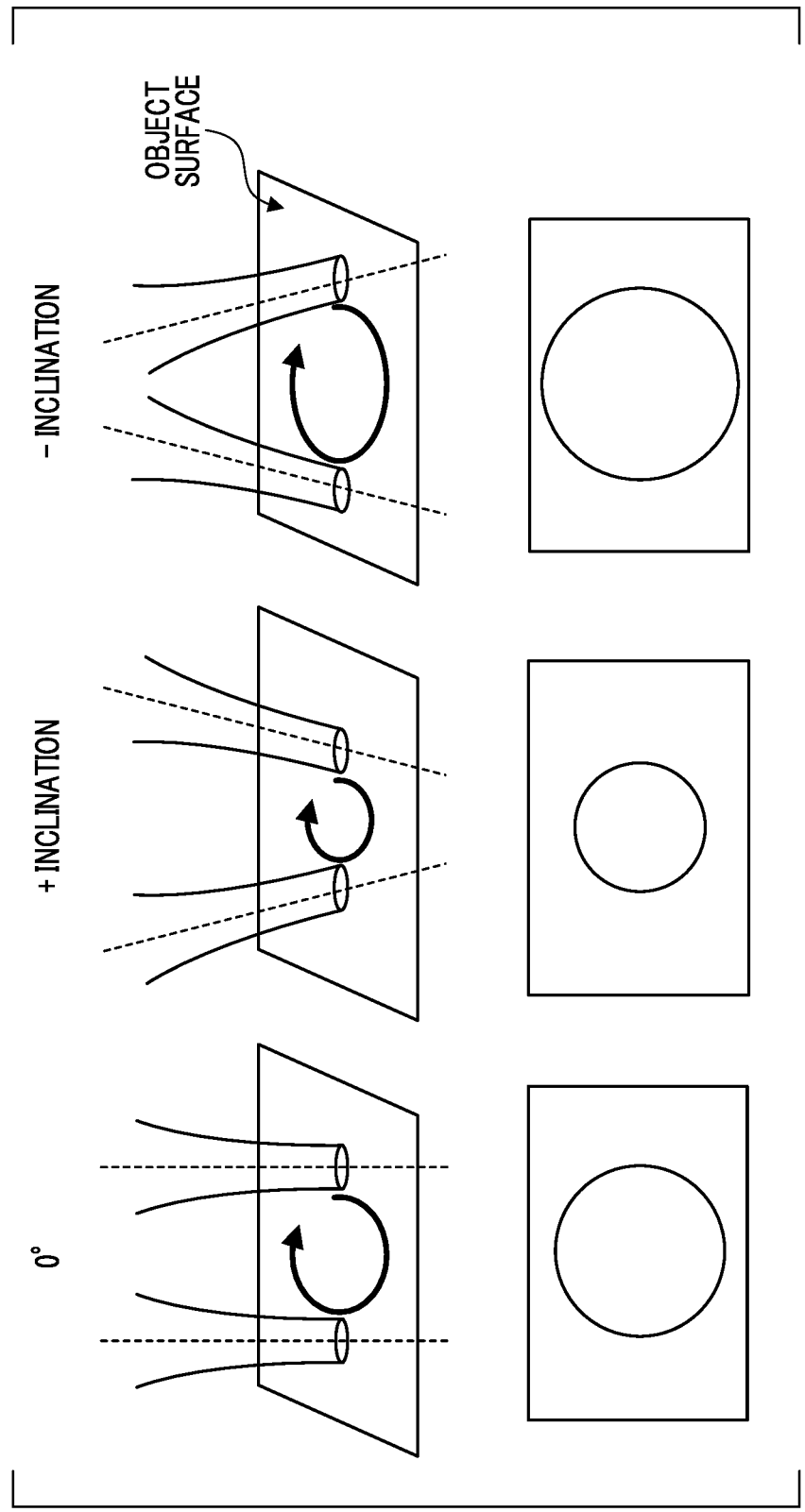
FIG. 6 is a diagram illustrating an example of a state of laser processing when only an autofocus operation is performed.

However, when the laser processing is performed using the autofocus operation, shifting of the incident position due to the incident angle may occur. FIG. 6 is a diagram illustrating an example of a state of the laser processing when only the autofocus operation is performed. For example, when circular processing is performed using the laser processing device 100, if the incident angle is changed, the incident position is shifted. Thus, a size of a circle is changed in accordance with the incident angle. As shown in FIG. 6, if a circle when the incident angle is κ degrees is used as a reference, a circle to be processed when the incident angle is inclined in a + direction is smaller than that when the incident angle is 0 degrees. On the other hand, a circle to be processed when the incident angle is inclined in a − direction is larger than that of when the incident angle is 0 degrees. Thus, the processing accuracy may be decreased.

Therefore, in the embodiment, a calculation unit 37 built into the computer device 35 calculates an amount of correction for the shifting of the incident position due to the incident angle based on an amount of adjustment using the focal position adjustment mechanism, in order words, an amount of driving of the focal position adjustment mechanism. That is to say, the calculation unit 37 calculates an amount of correction for correcting shifting of the incident position based on an amount of driving of the focal position adjustment mechanism and an amount of driving of the angle adjustment mechanism. Furthermore, the laser processing is performed by transmitting an instruction value based on the amount of correction to the control unit 60 and driving the (galvano) mirrors 20 and 21 using the corrected drive signal from the control unit 60. That is to say, in the embodiment, the control unit 60 controls the driving of an incident position adjustment mechanism based on the amount of driving of the focal position adjustment mechanism to correct the shift of the incident position due to the changing of the focal position.

If it is assumed that an amount of driving of the focal position adjustment mechanism, that is, an amount of movement of the focal position through the autofocus operation is $\Delta Z$, an incident angle in an X direction is $\theta x$, and an incident angle in a Y direction is $\theta y$, an amount of incident position shifting $\Delta X$ in the X direction and an amount of incident position shift $\Delta Y$ in the Y direction are represented by the following expression.

$$\Delta X = \Delta Z \times \tan(\theta x)$$

$$\Delta Y = \Delta Z \times \tan(\theta y) \quad \text{[Expression 1]}$$

Figure 7B:
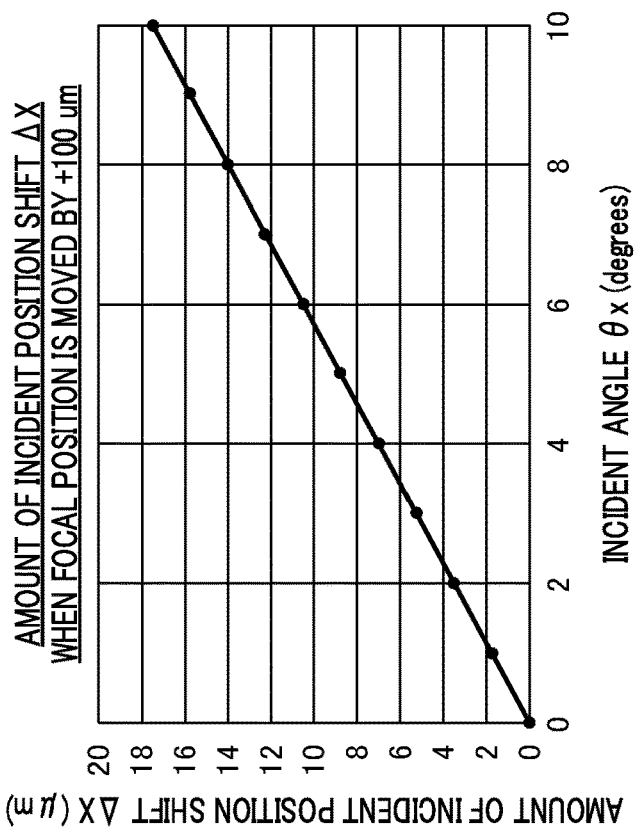
FIGS. 7A and 7B are diagrams illustrating numerical examples of an amount of shift of an incident position due to autofocus.
Figure 7A:
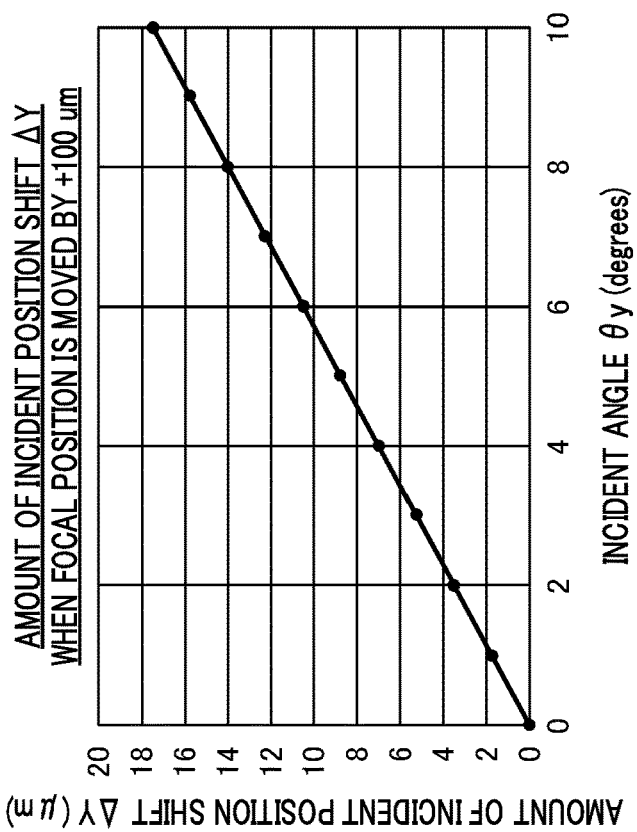

FIGS. 7A and 7B are diagrams illustrating numerical examples of an amount of shift of an incident position due to autofocus. FIGS. 7A and 7B are examples of numerical values obtained by calculating the amount of incident position shift $\Delta X$ in the X direction and the amount of incident position shift $\Delta Y$ in the Y direction using the foregoing expression. FIG. 7A illustrates an example of the amount of incident position shift $\Delta X$ in the X direction when the focal position is moved by +100 um. FIG. 7B illustrates an example of the amount of incident position shift $\Delta Y$ in the Y direction when the focal position is moved by +100 um. For example, when the focal position is moved by +100 um through the autofocus operation, the amount of incident position shift $\Delta X$ in the X direction is 0 um when the incident angle $\theta x$ in the X direction is 0 degrees, the amount of incident position shift $\Delta X$ in the X direction is 8.75 um when the incident angle $\theta x$ in the X direction is 5 degrees, and the amount of incident position shift $\Delta X$ in the X direction is 17.6 um when the incident angle $\theta x$ in the X direction is 10 degrees. Similarly, the amount of incident position shift $\Delta Y$ in the Y direction is 0 um if an incident angle $\theta y$ in the Y direction is 0 degrees, 8.75 um if the incident angle $\theta y$ in the Y direction is 5 degrees, and 17.6 um if the incident angle $\theta y$ in the Y direction is 10 degrees.

Therefore, the amounts of incident position shift $\Delta X$ and $\Delta Y$ due to the above incident angle is calculated and an amount obtained by reversing a sign of this amount of positional shift is an amount of correction. For this reason, the laser processing may be performed by transmitting the instruction value in consideration of the amount of correction to the control unit 60 and driving the (galvano) mirrors 20 and 21 using the corrected drive signal from the control unit 60.

Figure 8:
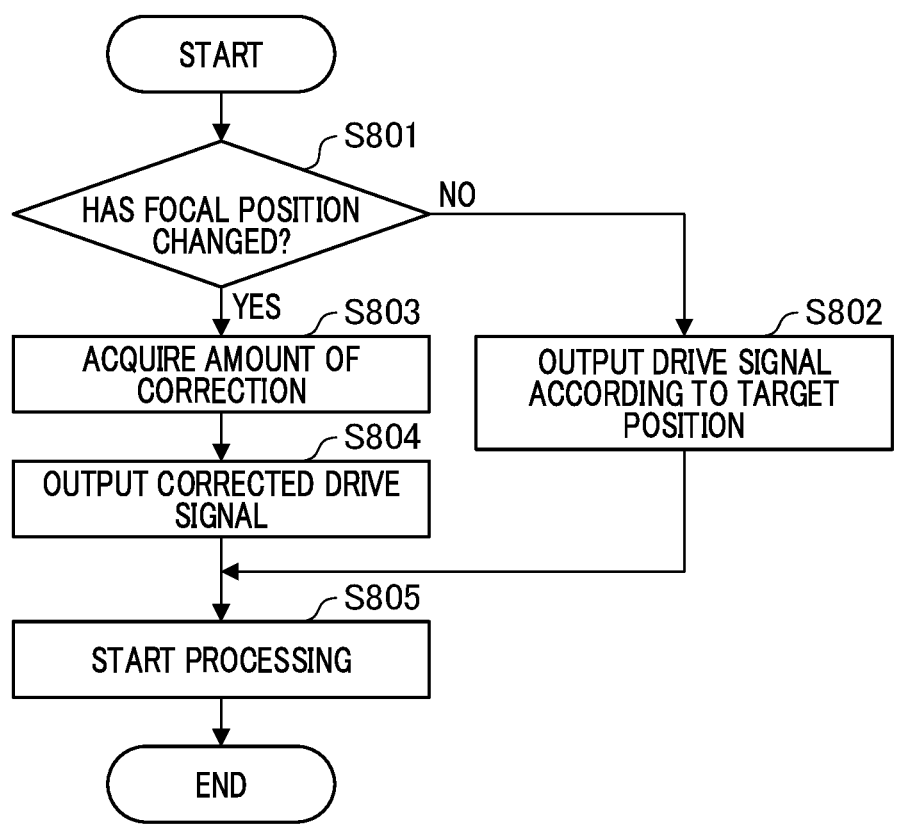
FIG. 8 is a flowchart for describing a process of correcting an incident position shift according to the embodiment.

FIG. 8 is a flowchart for describing a process of correcting an incident position shift according to the embodiment. First, the control unit 60 determines whether the focal position has been changed (S801). Here, when it is determined that the focal position has not changed (No), the control unit 60 outputs a drive signal according to a target position above the object 23 and drives the (galvano) mirrors 20 and 21 (S802) and starts the laser processing (S805).

On the other hand, when it is determined that the focal position has changed (Yes), the calculation unit 37 calculates an amount of correction based on the foregoing expression (S803). Furthermore, the calculation unit 37 outputs the instruction value based on the amount of correction to the control unit 60. At this time, for example, the amount of correction corresponding to the amount of shift may be stored in a storage unit such as a memory built into the computer device 35. In this case, the computer device 35 outputs an instruction value to the control unit 60 based on the amount of correction corresponding to the amount of shift stored in the storage unit. In addition, the calculation through the calculation unit 37 and the stored amount of correction may be used together. Moreover, the control unit 60 outputs the corrected drive signal based on the acquired instruction value and drives the (galvano) mirrors 20 and 21 (S804) and starts the laser processing (S805).

FIG. 9 is a diagram illustrating an example of a state of the laser processing according to the embodiment. According to the embodiment, since the correction of the incident position according to the incident angle is performed, it is possible to reduce the changing of a size of a circle due to the incident angle even when the circle processing is performed as in FIG. 6. Thus, the size of the circle is constant regardless of the incident angle and highly accurate processing can be realized.

As described above, the processing device according to the embodiment can reduce an error between the surface position of the object and the focal position of the laser light and can improve the accuracy of the laser processing even when the object surface of the object to be processed is in a concave and convex shape or a curved surface shape.

Embodiment Associated With Article Manufacturing Method

The processing device according to the embodiment described above can be used for a method of producing an article. The method of producing an article may include processing an object (a subject) using the processing device and processing the object processed in this operation. The processing may include, for example, at least one of processing, transportation, inspection, sorting, assembly (assembling), and packaging different from the processing. The method of producing an article in the embodiment is advantageous in at least one of the performance, quality, productivity, and production cost of the article as compared with conventional methods.

Other Embodiments

Although the control unit 60 and the computer device 35 are separate bodies in the above-described embodiment, the control unit 60 may realize a function of the computer device 35 or the computer device 35 may realize a function of the control unit 60.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-154010, filed Aug. 26 2019, which is hereby incorporated by reference wherein in its entirety.

What is claimed is:

1. An optical device which processes a subject by irradiating the subject with laser light, comprising:
a first galvano mirror optical system including two galvano mirrors and configured to adjust an incident angle of the laser light incident on the subject in two directions by driving the two galvano mirrors;
a focal position adjustment mechanism including a movable lens and configured to adjust a focal position of the laser light in a focal direction by driving the movable lens;
a second galvano mirror optical system including another two galvano mirrors and configured to adjust an incident position of the laser light incident on the subject in two directions perpendicular to the focal direction of the laser light by driving the another two galvano mirrors; and
a control unit configured to control driving of the two galvano mirrors of the first galvano mirror optical system, the movable lens, and the another two galvano mirrors of the second galvano mirror optical system,
wherein the control unit controls the driving of the another two galvano mirrors of the second galvano mirror optical system based on the driving of the movable lens so as to correct a shift of the incident position of the laser light obliquely incident on the subject due to a change of the focal position by the driving of the movable lens.

2. The optical device according to claim 1, wherein the control unit calculates an amount of correction for correcting the shift of the incident position in accordance with the incident angle based on an amount of the driving of the movable lens and controls the driving of the another two galvano mirrors of the second galvano mirror optical system using the calculated amount of correction.

3. The optical device according to claim 2, wherein the control unit calculates the amount of correction based on the amount of the driving of the movable lens and an amount of the driving of the two galvano mirrors of the first galvano mirror optical system.

4. The optical device according to claim 2, further comprising:
a storage unit configured to store the amount of correction corresponding to the amount of shift of the incident position.

5. The optical device according to claim 1, further comprising:
a detection unit configured to detect reflected light from the subject irradiated with the laser light,
wherein the control unit controls the driving of the movable lens based on an amount of light of the reflected light to be detected by the detection unit.

6. The optical device according to claim 5, wherein the control unit drives the movable lens so that the amount of light of the reflected light to be detected is maximized.

7. The optical device according to claim 5, wherein the detection unit detects light using a confocal optical system.

8. The optical device according to claim 5, wherein an amount of light used at the time of performing detection through the detection unit is less than an amount of light used at the time of processing the subject.

9. An article manufacturing method, comprising:
processing a subject using an optical device which processes the subject by irradiating the subject with laser light; and
processing the subject which has been subjected to the processing in the step,
wherein the optical device includes:
a first galvano mirror optical system including two galvano mirrors and configured to adjust an incident angle of the laser light incident on the subject in two directions by driving the two galvano mirrors;
a focal position adjustment mechanism including a movable lens and configured to adjust a focal position of the laser light in a focal direction by driving the movable lens;
a second galvano mirror optical system including another two galvano mirrors and configured to adjust an incident position of the laser light incident on the subject in two directions perpendicular to the focal direction of the laser light by driving the another two galvano mirrors; and
a control unit configured to control driving of the two galvano mirrors of the first galvano mirror optical system, the movable lens, and the another two galvano mirrors of the second galvano mirror optical system,
wherein the control unit controls the driving of the another two galvano mirrors of the second galvano mirror optical system based on the driving of the movable lens so as to correct a shift of the incident position of the laser light obliquely incident on the subject due to a change of the focal position by the driving of the movable lens.

10. An optical device which processes a subject by irradiating the subject with laser light, comprising:
a focal position adjustment mechanism configured to adjust a focal position of the laser light;
an incident position adjustment mechanism configured to adjust an incident position of the laser light incident on the subject in a direction perpendicular to a focal direction of the laser light;
a control unit configured to control driving of the focal position adjustment mechanism and the incident position adjustment mechanism; and
a detection unit configured to detect reflected light from the subject irradiated with the laser light, wherein the control unit controls the driving of the incident position adjustment mechanism based on an amount of driving of the focal position adjustment mechanism so as to correct a shift of the incident position due to a change of the focal position, wherein the control unit controls the driving of the focal position adjustment mechanism based on an amount of light of the reflected light to be detected by the detection unit, and wherein the control unit drives the focal position adjustment mechanism so that the amount of light of the reflected light to be detected is maximized.

11. An optical device which processes a subject by irradiating the subject with laser light, comprising:
- a focal position adjustment mechanism configured to adjust a focal position of the laser light;
- an incident position adjustment mechanism configured to adjust an incident position of the laser light incident on the subject in a direction perpendicular to a focal direction of the laser light;
- a control unit configured to control driving of the focal position adjustment mechanism and the incident position adjustment mechanism; and
- a detection unit configured to detect reflected light from the subject irradiated with the laser light, wherein the control unit controls the driving of the incident position adjustment mechanism based on an amount of driving of the focal position adjustment mechanism so as to correct a shift of the incident position due to a change of the focal position, wherein the control unit controls the driving of the focal position adjustment mechanism based on an amount of light of the reflected light to be detected by the detection unit, and wherein the detection unit detects light using a confocal optical system.

12. An optical device which processes a subject by irradiating the subject with laser light, comprising:
- a focal position adjustment mechanism configured to adjust a focal position of the laser light;
- an incident position adjustment mechanism configured to adjust an incident position of the laser light incident on the subject in a direction perpendicular to a focal direction of the laser light;
- a control unit configured to control driving of the focal position adjustment mechanism and the incident position adjustment mechanism; and
- a detection unit configured to detect reflected light from the subject irradiated with the laser light, wherein the control unit controls the driving of the incident position adjustment mechanism based on an amount of driving of the focal position adjustment mechanism so as to correct a shift of the incident position due to a change of the focal position, wherein the control unit controls the driving of the focal position adjustment mechanism based on an amount of light of the reflected light to be detected by the detection unit, and wherein an amount of light used at the time of performing detection through the detection unit is less than an amount of light used at the time of processing the subject.

* * * * *